March 1, 1966 R. R. ODDO ETAL 3,238,524
IN LINE BRUSHES FOR DRUM TYPE ENCODERS FOR TRUE "V" SCAN APPLICATION FOR TRUE BINARY CODE
Filed Dec. 21, 1962 2 Sheets-Sheet 1

ROCCO R. ODDO
GEORGE LAPP
INVENTOR.
BY S. A. Giarratana
Francis L. Masselle
ATTORNEYS March 1, 1966 R. R. ODDO ETAL 3,238,524

IN LINE BRUSHES FOR DRUM TYPE ENCODERS FOR TRUE "V" SCAN APPLICATION FOR TRUE BINARY CODE

Filed Dec. 21, 1962 2 Sheets-Sheet 2

RALPH R. ODDO
GEORGE LAPP
INVENTORS

BY S. A. Giarratana
Francis L. Masselle
ATTORNEYS

United States Patent Office 3,238,524

Patented Mar. 1, 1966

3,238,524
IN LINE BRUSHES FOR DRUM TYPE ENCODERS FOR TRUE "V" SCAN APPLICATION FOR TRUE BINARY CODE

Ralph Rocco Oddo, Brooklyn, N.Y., and George Lapp, Oakland, N.J., assignors to General Precision Inc., Little Falls, N.J., a corporation of Delaware Filed Dec. 21, 1962, Ser. No. 246,450
11 Claims. (Cl. 340—347)

The present invention relates to drum type binary encoders, and more particularly to a drum type binary encoder having lines of lead and lag brushes extending parallel to the axis of the drum and cooperating with true binary code tracks on the drum to produce a non-ambiguous output.

One prior method for obtaining a non-ambiguous output from drum-type encoders employs what is known as a True V Scan technique. In accordance with this technique, lead and lag brushes are associated with each of the true binary code tracks on the drum with the exception of the least most significant track which has only one brush associated therewith. The logic state of a lead or lag brush for a particular track is determined by the logic state of the brush or brushes of the next least significant track. If we here define $2^h$ as the most significant code track and $2^{h-h}$ or $2^0$ as the least significant track, this can be restated as follows. The lead or lag brush to be read for the $2^{h\text{th}}$ track is determined by the logic state of the $2^{h-1}$ track. The logic decision itself is performed by suitable circuitry which is well known in the art. In using the True V Scan technique for drum applications, some of the brushes must be mounted on an exponential curve and the angular separation of each bit in each code track is predicted by the angular bit length of a bit in the preceding least significant code track.

In manufacturing drum-type encoders employing True V Scan, it is very difficult to maintain the necessary manufacturing accuracy, and consequently such encoders are quite expensive. Because of this, disc-type encoders are more commonly used in the field today. These encoders utilize a disc in place of a drum with the code tracks on a face of the disc and the brushes mounted in a straight line across a diameter of the face of the disc. A major disadvantage of this type of encoder is the phenomenon known as brush bounce which is experienced because of face runout. It is difficult to prevent and imposes an undesirable limitation on the readout and shaft speeds.

Another type of encoder utilizes in-line brushes with split code tracks. Each code track is split into two tracks with a brush associated with each split track. This type of construction results in high inertia problems, and also in high manufacturing costs.

In accordance with the present invention, a non-ambiguous readout is obtained from a True V Scan type of encoder with the lead and lag brushes mounted in straight lines across the code tracks, rather than along an exponential curve, to greatly simplify manufacturing problems. The code tracks employed are normal true binary code tracks, and the non-ambiguity is achieved by angularly spacing the two lines of brushes a predetermined angle apart from one another. This angle, as will be described in greater detail hereinafter, is equal to the angle defined by a bit length of one of the code tracks more significant than the least most significant code track, plus or minus the angle defined by a bit length of the least most significant code track. By spacing the lines of brushes this specific angle from one another and by reading the lead and lag brushes in a predetermined manner with or without a predetermined angular displacement of some of the code tracks relative to one another, a non-ambiguous readout is obtained with in-line brushes.

Accordingly, it is one object of the invention to provide drum-type encoders which produce non-ambiguous outputs.

It is another object of the invention to provide drum-type encoders having lead and lag brushes arranged in lines parallel to the axis of the drum in a manner to ease manufacturing tolerances and produce non-ambiguous outputs.

It is a further object of the invention to provide drum-type binary encoders employing true binary code tracks read by two lines of lead and lag brushes extending across the code tracks parallel to the axis of the drum and spaced from one another a predetermined angle to ensure a non-ambiguous output.

It is a still further object of the invention to provide drum-type binary encoders which produce non-ambiguous outputs and are less expensive and easier to manufacture than prior drum-type binary encoders employing a True V Scan technique.

Other objects and features of novelty of the present invention will be specifically pointed out or will otherwise become apparent when referring, for a better understanding of the invention, to the following description taken in conjunction with the accompanying drawings, wherein.

Figure 1:
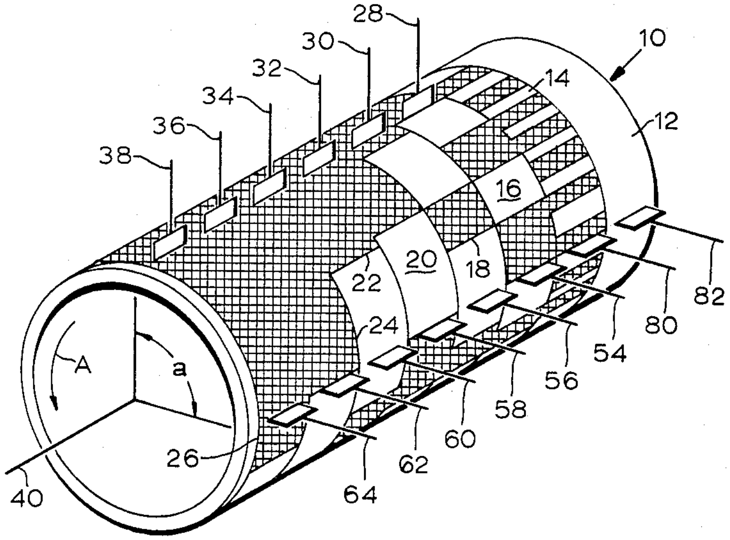
FIG. 1 is a perspective view of a drum and brush assembly for a binary encoder embodying features of the invention.

Referring to FIG. 1, a drum and brush assembly 10 for a binary encoder is illustrated which embodies features of the present invention. It comprises a cylindrical drum 12 having a plurality of code tracks 14–26 encircling the cylindrical surface thereof. A plurality of lag brushes 28–38 extend across the code tracks along a line parallel to the axis 30 of the drum 12 with the brushes making sliding electrical contact severally with the code tracks 16–26. A plurality of lead brushes 54–64 are similarly aligned parallel to the axis 30 and make sliding electrical contact severally with the code tracks 14–26, respectively. A single brush 80 makes sliding electrical contact with the code track 14. An input brush 82 makes sliding contact with a conducting common track 84 next to the least most significant track 14.

Figure 2:
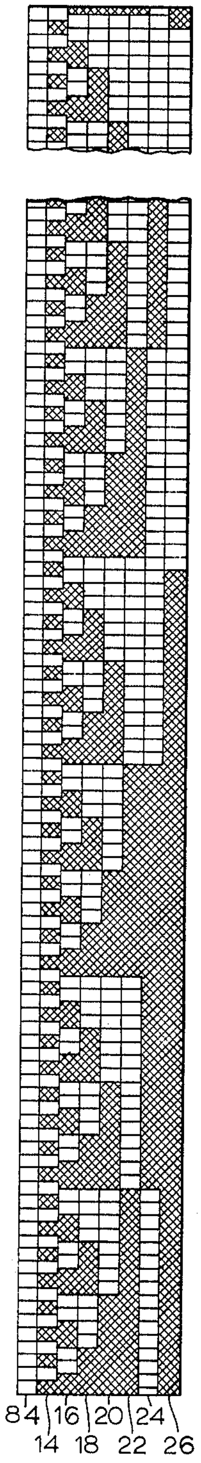
FIG. 2 is a developed view of the code tracks on the drum illustrated in FIG. 1.

The code tracks 14–26 are more clearly illustrated in developed form in FIG. 2. They provide a true binary code with the track 14 being the least significant track and track 26 being the most significant track. The black bits of the tracks are non-conducting and the white bits are conducting. It will be observed that the track 26 has two bits each extending over 180° of the drum surface. The track 24 has four bits, each extending over 90° of the drum surface. Each of the bits of the track 22 occupy 45°, each of the bits of the track 20 occupy 22½°, each of the bits of the track 18 occupy 11¼°, each of the bits of the track 16 occupy 5⅝°, and each of the bits of the track 14 occupy 2¹³⁄₁₆°.

In the specific empodiment illustrated, the 90° bits of the track 24 are shifted 45° relative to the bits of the track 22 and the 180° bits of the track 26 are shifted in the same direction 90° plus 2¹³⁄₁₆° (the angle occupied by the least most significant bits of track 14). The purpose for the shifting of the tracks 25 and 26 will be described in greater detail hereinafter. Referring back to FIG. 1, it will be observed that the lines of said lead and lag brushes are angularly displaced from one another by an angle α which is equal to 90°+2^13/16°, the angle occupied by each of the bits of the code track 24 plus the angle occupied by one of the least most significant bits of the code track 14.

Figure 3:
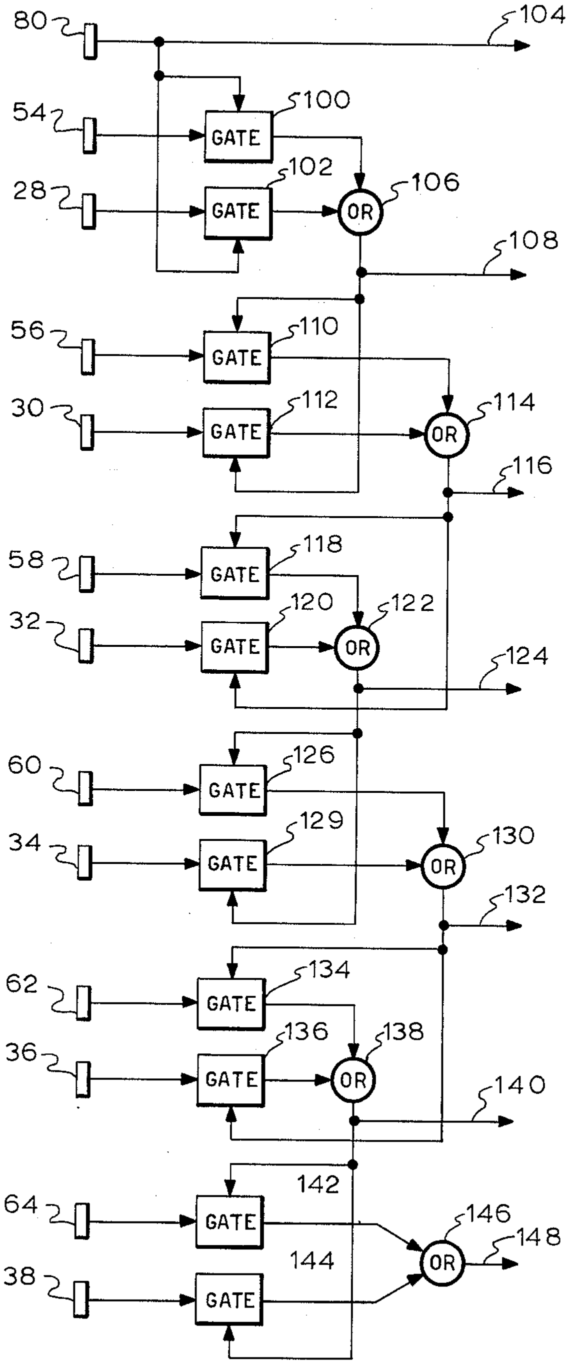
FIG. 3 is a schematic diagram of logic circuitry for reading out the brushes illustrated in FIG. 1.

With this construction the logic circuitry of FIG. 3 can be connected to the brushes, as will be described, to produce a non-ambiguous binary number output. The reason that this construction produces a non-ambiguous output will be apparent from the following discussion. By studying the pattern of a true binary code, it will be recognized that a symemtrical state is obtained by providing bits having lengths which occupy angles of 180°, 90°, 45°, 22½°, 11¼°, 5.625°, 2.8125°, etc. as illustrated by the code tracks of FIG. 2. Now assuming that the code tracks 14, 24 and 26 are not displaced as illustrated in FIG. 2, it will be apparent that if a line of brushes were placed on the drum parallel to the axis thereof at any angular position and a second line of brushes were placed at any of the above-mentioned angles, the state of the lead brushes and the lag brushes would be identical for each track, with the exception of that brush, and the following more significant brushes, which engage the code track having bit lengths occupying the same angle as the angle between the lines of brushes. However, if these more significant code tracks were shifted to reflect the pattern, it would be possible to obtain a combination, or many combinations, which would enable a True V Scan output to be obtained.

The embodiment shown in FIGS. 1 and 2 illustrates one such combination which is obtained by shifting the code tracks 24 and 26 as described. In this particular embodiment, the angle between the lines of brushes was selected as 90° (plus one least significant bit) on the basis of manufacturing considerations only. With this angle chosen, the code track 24 having the 90° bits, is shifted 45° (one-half a bit length), and the code track 26 is shifted 90° (one-half a bit length) to avoid ambiguities in these tracks. The reason for displacing the lines of brushes 90° plus the one least significant bit rather than 90° is to ensure that the lead and lag brushes engaging the same track do not approach transition points at precisely the same time. It is also apparent that this result can be obtained by making the angle between the line of brushes 90° minus one least significant bit, but it has been found to be more advantageous to increase the angle by one least significant bit. It is also noted here that to ensure non-ambiguity the least significant bit is displaced plus or minus one-half bit and this remains a constant regardless of the angle between the lines of brushes.

Once the angle between the lines of brushes has been selected, it only remains to ascertain the particular lead or lag designation to be given to each brush in the respective lines. This will depend upon the code track configuration which, in turn, depends upon the angle between the lines of brushes. With the code track configuration of FIG. 2 and the 90° angle between the lines of brushes, the logic circuitry of FIG. 3 may be employed to read out the brushes. The brush 80 controls the gates 100 and 102, and the output 104 provides a direct read out of the state of the brush 80. If the brush 80 is on a conducting bit of the code track 14, it enables the gate 100 and disables the gate 102. With the gates in this condition, only the lead brush 54 will be read out. If the brush 54 is on a conducting bit of the code track 16, it applies a signal to the OR gate 106 and if it is on a non-conducting bit no signal will be applied to the OR gate. Conversely, if the brush 80 is on a non-conducting bit of the track 14, the gate 100 will be disabled and the gate 102 will be enabled. Therefore the lag brush 28 will be read out and will apply a signal to the OR gate 106 if it is on a conducting bit. The OR gate 106 applies a signal to the output 108 to provide a readout for the code track 16 and also controls the gates 110 and 112.

The brushes 56 and 30 contacting the code track 18 are connected directly to the gates 110 and 112, respectively. If a signal is received from the OR gate 106, the gate 110 is enabled and the gate 112 is disabled so that only the brush 56 will be read out. Conversely, if no signal is received from the OR gate, the gate 110 will be disabled and the gate 112 will be enabled so that only the brush 30 will be read out. The signals from the gates 110 and 112 are applied to the OR gate 114 which controls the output 116 and the gates 118 and 120. The brushes 58 and 32 associated with the track 20 are connected directly to the gates 118 and 120, respectively, and the gates are controlled by the signal from the OR gate 114 to read out either the brush 58 or the brush 32. The signals from the gates 118 and 120 are applied to the OR gate 122 which controls the output 124 and the gates 126 and 128 to which the brushes 60 and 34 are connected. These gates apply signals to the OR gate 130 in the same manner, and the OR gate 130 controls the output 132 and the gates 134 and 136.

The brushes 62 and 36 associated with the track 34 are connected directly to the gates 134 and 136 which, in turn, apply their signals to the OR gate 138, which controls the output 140 and the gates 142 and 144. However, since the brushes 62 and 36 are reading the track 24 which has bit lengths occupying the same angle as the angle between the lines of brushes, the gates 134 and 136 are reversed from the previously mentioned gates. That is, the gate 134 is the inhibited AND gate and the gate 136 the AND gate. Thus when a signal is applied to the gates 134 and 136 by the OR gate 130, the state of the lag brush 36 will be read out rather than the lead brush 62. Conversely, if no signal is received from the OR gate 130, the gate 134 will read out the state of the lead brush 62 and the gate 136 will be disabled. This is the reverse of all the previously mentioned gates associated with the lesser significant tracks, and in effect reverses the lead and lag role of the brushes 62 and 36.

The signal from the OR gate 138 is applied to the gates 142 and 144 with the gate 142 now being the AND gate and the gate 144 the inhibited AND gate. The lead brush 64 is connected directly to the gate 142 and the lag brush 38 is connected directly to the gate 144. Therefore these gates again read out the lead brush 64 when a signal is received from the OR gate 138 and read out the lag brush 38 when no signal is received. The gates 142 and 144 apply signals to the OR gate 146 which controls the output 148.

As stated previously, the angle between the lines of brushes in the embodiment of FIG. 1 was selected solely on the basic manufacturing considerations. It is to be understood that any of the angles occupied by the bits of any of the tracks 16–26 could be used for the angular spacing between the lines of brushes. If this were done, then the bits of the track occupying the same angle as the lines of brushes would be shifted one-half the angle which they occupy, and the bits of all more significant tracks would be advanced one-half the angle they occupy. For example, if the lines of brushes were angularly spaced 22½° (plus or minus one least significant bit) which is the angle occupied by the bits of the track 20, the bits of the track 20 would be shifted 11¼° and the bits of the tracks 22, 24 and 26 would be advanced through one-half the angle which they occupy. With this specific example, the gates 118 and 120 connected to the brushes 58 and 32 associated with the track 20 would be reversed so that the gate 118 would be the inhibited AND gate and the gate 120 would be the AND gate. All of the other gates connected to the lead brushes would be AND gates and all of the other gates connected to the lag brushes would be inhibited AND gates.

The feature which enables the in-line brushes to produce a non-ambiguous output is the predetermined angular displacement between the lines of brushes. In the foregoing discussion, specific examples of angular spacings between the lines of brushes have been given, along with examples of code patterns useable with the specific angles between the brushes and logic circuitry for reading out the lines of brushes. However, these specific examples are not all-inclusive, and, in fact, a large family of solutions exist for any number of tracks (not just seven) with the two parallel lines of brushes separated by any shaft angle as will be seen from the following discussion.

The angle $\alpha$ between the lines of brushes may be expressed as:

$$\alpha = L_k + e \quad (1)$$

where $k=0, 1, 2 \ldots, n-1$ $n$ is the number of code tracks $L_k$ is the angular bit length of the $k^{th}$ track $$0 < e \leq L_0$$

$L_0$ is the angular bit length of the 0 track (the least significant track)

In any track other than the least significant track a brush position error less than $e/2$ will not cause an output error. The natural choice is $e=L_0$ so that the tolerance $e/2$ is equal to one-half of a least significant bit, but the results presented hereafter are also valid for any other choice of $e$ in the range of $0<e\leq L_0$. First it is necessary to specify the position of the reference brush, which is the single brush in the least significant track ($k=0$). The reference brush can be placed in the line of lead brushes or the line of lag brushes. The solution for one case defines the other, except for obvious changes, so this discussion will assume that the reference brush is in the line of lead brushes. Further, if the assumption is made that the reference brush is moved slightly out of line with the lead brushes, namely, by a shift in the lag direction equal to the tolerance $e/2$ the terminology below can be simplified. The desired solutions (in which the reference brush is in line with the lead brushes) are deduceable immediately from the solutions stated below by (1) giving the $K=0$ track (the least signicant track) a shift $e/2$ in the lead direction or (2) giving all other tracks a shift $e/2$ in the lag direction. The lead direction is indicated by the arrow A in FIG. 2 and the lag direction is the opposite direction. However, with the reference brush out of line by an $e/2$ lag, the coded tracks may remain more nearly in a normal pattern. For example, with brush spacing $180°+e$, it is possible to use a drum coded with a standard binary pattern without any changes or shifts in the tracks.

If the spacing between the lines of brushes is $\alpha=L_k+e$, then the $k^{th}$ track plays a special role in the solution and is called the "A track." The $(k+1)$th track, if there is one, is called the "B track." Only these A and B tracks require special treatment. All other tracks can be coded and read normally, that is, with the lead brush read as lead and the lag brush read as lag, and with a normal unshifted binary code for each track. In what follows, L will be used to represent the bit length of the A or B track under discussion. X is used to represent a shift of a track's normal binary ON/OFF code from its standard position. The shift angle X is considered to be positive if the shift is in the lag direction, and negative if the shift is in the lead direction.

The "A track" must be coded and read in one of the following ways: (1) a normal binary code, unshifted, with the lead brush read as lead and the complement of the lag brush read as lag (the complement being achieved by inverting the output signal from the brush, (2) a normal binary code, shifted through an angle $X=L$, with the complement of the lead brush read as lead and the lag brush read as lag, and (3) a normal binary code, shifted through an angle $X=-L/2$ with the lead brush read as lag and the lag brush read as lead.

The "B track" must be coded and read in one of the following ways: (1) a normal binary code shifted through an angle $X=L/4$ with the lead brush read as lead and the lag brush read as lag, (2) a normal binary code shifted through an angle $X-3\ L/4$ with the lag brush read as lead and the complement of the lead brush read as lag, (3) a normal binary code shifted through an angle $X=L/4$ with the lead brush read as lag and the complement of the lag brush read as lead. Of course to provide a non-ambiguous readout, the solutions (1) above for both the A and B tracks will have to be used together. Similarly the solutions (2) will have to be used together and the solutions (3) used together.

In the example (1) above for the "B track," a large tolerance is available in connection with the angle X through which the track is shifted. Therefore, the "B track," in Example 1, can be shifted in any way which merely uses up unnecessary tolerance. Because of the broad tolerance, solutions are available which are not shifts of the normal binary code for the "B track" in Example 1.

In conclusion, the general solutions presented above allow the brushes to be placed on the drum in two parallel lines with any angular separation $\alpha=L_k+e$ for any number of tracks. Only the A and B tracks require special attention (only the A track if $L_k=180°$) and the rules for reading and coding these tracks have been given. All other tracks can be coded and read normally.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a binary encoder, a cylindrical drum, binary code tracks encircling said drum in axially spaced relation, a first substantially straight line of brushes extending across said code tracks and making sliding electrical contact severally with the tracks more significant than the least significant track, a second substantially straight line of brushes extending across said code tracks and making sliding electrical contact severally with the tracks more significant than the least significant track, said first and second lines of brushes being angularly displaced from one another through an angle equal to the angle defined by a bit of one of the code tracks contacted by said brushes plus or minus the angle defined by a bit of the least significant track, and a single brush making sliding electrical contact with the least significant code track.

2. In a binary encoder, a cylindrical drum, a plurality of true binary code tracks encircling said drum in axially spaced relation, a first substantially straight line of brushes extending across said code tracks and making sliding electrical contact severally with the code tracks, and a second substantially straight line of brushes extending across said code tracks and making sliding electrical contact severally with the tracks more significant than the least significant track, said first and second lines of brushes being angularly displaced from one another through an angle equal to the angle defined by bit of one of the code tracks more significant than the least significant track plus or minus the angle defined by a bit of the least significant code track.

3. A drum type encoder comprising a cylindrical drum, a plurality of binary code tracks encircling said drum in axially spaced relation, a first substantially straight line of brushes extending across the code tracks and making sliding electrical contact severally with the code tracks, a second substantially straight line of brushes extending across said code tracks and making sliding electrical contact severally with the tracks more significant than the least most significant track, said first and second lines of brushes being angularly displaced from one another by an angle equal to the angle defined by a bit of one of the code tracks more significant than the least significant code track plus or minus the angle defined by a bit of the least significant code track, said drum being rotatable in a direction from said first line of brushes toward said second line, and logic circuit means connected to said brushes to produce a non-ambiguous binary number output, said logic circuit means comprising a True V Scan type of logic circuit in which one or the other of a pair of brushes associated with a particular code track is read out as determined by the state of the brushes associated with the next least significant code track.

4. The invention as defined in claim 3 wherein the brushes of said first line are connected as lead brushes and the brushes of said second line are connected as lag brushes and the lag brush of said one track is read as the complement of lag.

5. The invention as defined in claim 3 wherein said one track is shifted in the direction of rotation of said drum through an angle equal to about one-half the angle defined by a bit of said one track.

6. The invention as defined in claim 5 in which each track more significant than said one track is shifted in the direction of rotation of the drum through an angle equal to one-half the angle defined by one of its own bits.

7. A drum-type encoder comprising a cylindrical drum, binary code tracks encircling said drum in axially spaced relation, a first substantially straight line of brushes extending across said code tracks and making sliding electrical contact severally with the tracks more significant than the least significant track, a second substantially straight line of brushes extending across said code tracks and making sliding electrical contact severally with the tracks more significant than the least significant track, said first and second lines of brushes being angularly displaced from one another through an angle equal to the angle defined by a bit of one of the tracks contacted by said brushes plus the angle defined by a bit of the least significant track, a single brush making sliding electrical contact with the least significant code track, said drum rotating in a direction from said first line of brushes toward said second line of brushes, and logic circuit means for producing a non-ambiguous binary number output.

8. The invention as defined in claim 7 wherein the bits of the least significant track are shifted through an angle defined by about one-half a bit length.

9. The invention as defined in claim 8 wherein said circuit means includes means for converting the output of the brush in said second line associated with said one track to its complement, the remaining brushes being read by standard True V Scan logic circuitry.

10. The invention as defined in claim 8 wherein said logic circuit means includes means for converting the output of the brush in said first line associated with said one track to its complement, means for converting the output of the brush in said first line associated with the track next most significant to said one track to its complement, and means for reversing the reading of the brushes associated with said next most significant track, said one code track being shifted in a direction opposite to the direction of rotation of said drum through an angle equal to the angle defined by one of its bits and said next most significant track being shifted in the same direction through an angle equal to three quarters of the angle defined by one of its bits.

11. The invention as defined in claim 8 wherein said circuit means includes means for reversing the reading of the brushes associated with said one track, means for converting the output of the brush in said second line associated with the track next most significant to said one track to its complement, and means for reversing the reading of the brushes associated with said next most significant track, said one code track being shifted in the direction of rotation of said drum through an angle equal to one-half the angle defined by one of its bits and said next most significant track being shifted in the same direction through an angle equal to one-quarter the angle defined by one of its bits.

References Cited by the Examiner

UNITED STATES PATENTS

| | | | |
|---|---|---|---|
| 2,958,861 | 11/1960 | Luongo et al. | 340—347 |
| 3,130,399 | 4/1964 | Paul | 340—347 |

DARYL W. COOK, *Acting Primary Examiner.*

MALCOLM A. MORRISON, *Examiner.*

L. W. MASSEY, K. R. STEVENS, *Assistant Examiners.*